(12) United States Patent
Hadziioannou et al.

(10) Patent No.: US 12,134,691 B2
(45) Date of Patent: Nov. 5, 2024

(54) CROSSLINKABLE ELECTROACTIVE FLUORINATED POLYMERS

(71) Applicants: Arkema France, Colombes (FR); UNIVERSITE DE BORDEAUX, Bordeaux (FR); INSTITUT POLYTECHNIQUE DE BORDEAUX, Talence (FR); CENTRE NATIONAL DE LA RECHERCHE SCIENTIFIQUE, Paris (FR)

(72) Inventors: Georges Hadziioannou, Léognan (FR); Eric Cloutet, Bègles (FR); Cyril Brochon, Mérignac (FR); Damien Thuau, Bordeaux (FR); Konstantinos Kallitsis, Bordeaux (FR); Fabrice Domingues Dos Santos, Paris (FR); Thibaut Soulestin, Lyons (FR)

(73) Assignees: ARKEMA FRANCE, Colombes (FR); UNIVERSITE DE BORDEAUX, Bordeaux (FR); INSTITUT POLYTECHNIQUE DE BORDEAUX, Talence (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 1158 days.

(21) Appl. No.: 16/631,882

(22) PCT Filed: Jul. 16, 2018

(86) PCT No.: PCT/FR2018/051791
§ 371 (c)(1),
(2) Date: Jan. 17, 2020

(87) PCT Pub. No.: WO2019/016454
PCT Pub. Date: Jan. 24, 2019

(65) Prior Publication Data
US 2020/0157334 A1    May 21, 2020

(30) Foreign Application Priority Data

Jul. 17, 2017 (FR) .................................. 1756742

(51) Int. Cl.
*C08F 214/04* (2006.01)
*C08F 8/30* (2006.01)
*C08F 214/16* (2006.01)
*C08F 214/22* (2006.01)
*C08F 214/24* (2006.01)
*C08L 27/16* (2006.01)

(52) U.S. Cl.
CPC ............... *C08L 27/16* (2013.01); *C08F 8/30* (2013.01); *C08F 214/04* (2013.01); *C08F 214/16* (2013.01); *C08F 214/22* (2013.01); *C08F 214/24* (2013.01); *C08F 2800/10* (2013.01); *C08L 2203/16* (2013.01); *C08L 2203/20* (2013.01); *C08L 2205/025* (2013.01); *C08L 2312/00* (2013.01)

(58) Field of Classification Search
CPC .......... C08F 8/30; C08F 14/22; C08F 214/22; C08F 14/18; C08F 214/182; C08F 214/16; C08F 214/24
See application file for complete search history.

(56) References Cited

U.S. PATENT DOCUMENTS

2007/0166838 A1   7/2007   Marsman et al.
2011/0218305 A1   9/2011   Klaus et al.
2015/0005456 A1   1/2015   Marrani et al.

FOREIGN PATENT DOCUMENTS

| CN | 104987631 A | * 10/2015 | ............ C08F 214/22 |
|---|---|---|---|
| JP | 2012500322 A | 1/2012 | |
| JP | 2015500910 A | 1/2015 | |
| KR | 10-2011-0056506 A | 5/2011 | |
| KR | 10-2014-0107427 A | 9/2014 | |
| WO | 2007080338 A2 | 7/2007 | |
| WO | 2010/021962 A2 | 2/2010 | |
| WO | 2010116105 A1 | 10/2010 | |
| WO | 2013/087500 A1 | 6/2013 | |
| WO | 2013087501 A1 | 6/2013 | |
| WO | 2015128337 A1 | 9/2015 | |
| WO | 2017072427 A1 | 5/2017 | |

OTHER PUBLICATIONS

International Search Report (with English Translation) and Written Opinion issued in corresponding International Patent Application No. PCT/FR2018/051791, 12 pages (dated Nov. 12, 2018).
Chen, Xiang-Zhong , et al., "Greatly Enhanced Energy Density and Patterned Films Induced by Photo Cross-Linking of Poly(vinylidene fluoridechlorotrifluoroethylene)," Macromolecular Rapid Communications, Macromolecular Journals, 32, pp. 94-99 (2011).
Desheng, Zhang , et al., "Ferroelectric properties of electron-irradiated copolymers of vinylidenefluoride and trifluoroethylene," Ferroelectrics, 264:1, pp. 21-26 (Mar. 16, 2011).
Mandal, Dipankar , et al., "The effect of X-ray photoelectron spectroscopy measurement on P(VDF-TrFE) copolymer thin films," Applied Surface Science, 261, pp. 209-213, (2012).
Shin, Yu Jin, et al., "Chemically Cross-Linked Thin Poly(vinylidene fluoride-cotrifluoroethylene) Films for Nonvolatile Ferroelectric Polymer Memory," Applied Materials Interfaces, pp. 582-589, (2011).
Soulestin, Thibaut , et al., "Vinylidene fluoride- and trifluoroethylene-containing fluorinatedelectroactive copolymers. How does chemistry impact properties?," Progress in Polymer Science, 72, pp. 16-60, (2017).

(Continued)

*Primary Examiner* — Irina S Zemel
*Assistant Examiner* — Jeffrey S Lenihan
(74) *Attorney, Agent, or Firm* — Boone IP Law

(57) ABSTRACT

The invention relates to a copolymer comprising units derived from monomers of vinylidene fluoride and/or trifluoroethylene, as well as fluorinated monomers X comprising a double bond and a leaving group selected from among chlorine, bromine and iodine atoms, the leaving groups being partially replaced by azide groups in the copolymer.

12 Claims, 3 Drawing Sheets

(56) References Cited

OTHER PUBLICATIONS

Tan, Shaobo, et al., "Significantly improving dielectric and energy storage properties via uniaxially stretching crosslinked P(VDF-co-TrFE) films," Journal of Materials Chemistry A, 1, pp. 10353-10361 (2013).
Van Breemen, A.J.J.M., et al., "Photocrosslinking of ferroelectric polymers and its application in three-dimensional memory arrays," American Institute of Physics, Applied Physics Letters, 98, 183302, 3 pages (2011).
Yang, Lianyun, et al., "Novel polymer ferroelectric behavior via crystal isomorphism and the nanoconfinement effect," Polymer 54, pp. 1709-1728, (2013).
Office Action (Notice of Rejection) dated Jul. 26, 2022, by the Japanese Patent Office in corresponding Japanese Patent Application No. 2019-568385, and an English Translation of the Office Action. (9 pages).
Office Action dated Mar. 3, 2023, by the Intellectual Property Office in corresponding Korean Patent Application No. 10-2020-7003815, and an English Translation of the Office Action. (15 pages).
Second Office Action with English translation dated Apr. 20, 2023, by the China National Intellectual Property Administration for Chinese Application No. (201880046923.7), 12 pages.
Second Office Action with English translation dated Apr. 18, 2023, by the Japanese Patent Office for Japanese Application No. (2019-568385), 10 pages.

* cited by examiner

CROSSLINKABLE ELECTROACTIVE FLUORINATED POLYMERS

FIELD OF THE INVENTION

The present invention relates to crosslinkable electroactive fluoropolymers, to a process for preparing them, and to films produced from them.

TECHNICAL BACKGROUND

Electroactive fluoropolymers or EAFPs are primarily derivatives of polyvinylidene fluoride (PVDF). In this regard, see the article Vinylidene fluoride- and trifluoroethylene-containing fluorinated electroactive copolymers. How does chemistry impact properties? by Soulestin et al. in *Prog. Polym. Sci.* 2017 (DOI: 10.1016/j.progpolymsci.2017.04.004). These polymers exhibit particularly interesting dielectric and electromechanical properties. The fluorinated copolymers formed from vinylidene fluoride (VDF) and trifluoroethylene (TrFE) monomers are of particular interest on account of their piezoelectric, pyroelectric and ferroelectric properties. In particular they allow the conversion of mechanical or thermal energy into electrical energy, or vice-versa.

Some of these fluorinated copolymers also include units obtained from another monomer, having a chlorine or bromine or iodine substituent, and especially a chlorotrifluoroethylene (CTFE) or chlorofluoroethylene (CFE). Such copolymers exhibit a set of useful properties, namely a relaxor ferroelectric quality (characterized by a maximum for dielectric constant, as a function of temperature, which is broad and dependent on the frequency of the electric field), a high dielectric constant, a high saturation polarization, and a semicrystalline morphology.

Electroactive fluoropolymers are shaped into films, generally by application from a so-called ink formulation. During the production of electroactive devices, it may be necessary to make part or all of the film insoluble in accordance with a predefined pattern. The reason is that it is often necessary to apply other layers over the polymer film, so as to produce the desired device. This application of other layers often involves the use of a solvent. If the electroactive fluoropolymer is not crosslinked, it may be degraded by this solvent during the application of the other layers.

A number of methods have been proposed for crosslinking fluoropolymers.

The articles by Desheng et al. in *Ferroelectrics* 2001 (pp. 21-26), by Mandal et al. in *Appl. Surf. Sci.* 2012 (pp. 209-213) and by Yang et al. in *Polymer* 2013 (pp. 1709-1728) describe the crosslinking of fluoropolymers using irradiation with X-rays or with an electron beam.

Such irradiation is highly energetic and can therefore give rise to secondary chemical reactions affecting the structure of the polymer chains.

The article by Tan et al. in *J. Mat. Chem.* A 2013 (pp. 10353-10361) describes the crosslinking of a P(VDF-TrFE) copolymer by reaction with a peroxide compound.

The article by Shin et al. in *Appl. Mater. Inter.* 2011 (pp. 582-589) describes the crosslinking of a P(VDF-TrFE) copolymer by reaction with another crosslinking agent, namely 2,4,4-trimethyl-1,6-hexanediamine.

The document US 2007/01666838 describes a process for crosslinking fluoropolymers by UV irradiation in the presence of a bis-azide photoinitiator.

A similar technology is described in the articles by van Breemen et al. in *Appl. Phys. Lett.* 2011 (no. 183302) and by Chen et al. in *Macromol. Rapid. Comm.* 2011 (pp. 94-99).

In all of these documents, the crosslinking requires the presence of a crosslinking agent as well as the polymer. Adding this agent makes the preparation of the polymer film more complex and may give rise to a deterioration in the electroactive properties. Reducing the number of components used in the formulation for preparing the polymer film is a general desire.

The document WO 2013/087500 describes a fluoropolymer prepared by polymerizing VDF, TrFE, and a third monomer containing an azide group. This fluoropolymer may subsequently be crosslinked, preferably in the presence of a crosslinking agent.

Document WO 2013/087501 relates to a composition comprising a fluoropolymer comprising units obtained from VDF and TrFE and a crosslinking agent comprising azide groups.

Document WO 2015/128337 describes a fluoropolymer prepared by polymerizing VDF, TrFE, and a third, (meth) acrylic monomer. This fluoropolymer may subsequently be crosslinked, preferably in the presence of a crosslinking agent.

Document WO 2010/021962 describes fluoropolymers comprising azide groups, which may be obtained either by reacting a fluoropolymer with an azide compound or by polymerizing monomers in the presence of an azide compound. The fluoropolymer examples given in the document are of copolymers based on VDF and HFP (hexafluoropropylene), or iodo-terminated polymers (PVDF-I and 1-iodoperfluorooctane) which react with sodium azide.

None of these documents provides an electroactive polymer exhibiting the useful properties referred to above, and especially a high dielectric constant, where these useful properties are essentially retained after crosslinking.

SUMMARY OF THE INVENTION

The invention relates primarily to a copolymer comprising units obtained from vinylidene fluoride and/or trifluoroethylene monomers and from fluoro monomers X comprising a double bond and a leaving group selected from chlorine, bromine and iodine atoms, the leaving groups being partially replaced by azide groups in the copolymer.

In some embodiments the fluoro monomers X are selected from chlorotrifluoroethylene and chlorofluoroethylene.

In some embodiments the copolymer comprises both units obtained from vinylidene fluoride monomers and units obtained from trifluoroethylene monomers, the proportion of units obtained from trifluoroethylene monomers being preferably from 15 to 55 mol % relative to the sum of the units obtained from vinylidene fluoride and trifluoroethylene monomers.

In some embodiments the copolymer comprises a total amount of units obtained from fluoro monomers X of 1 to 20 mol %, preferably of 2 to 15 mol %

In some embodiments the molar proportion of leaving groups in the copolymer that are replaced with azide groups is from 5 to 90%, preferably from 10 to 75%, and more preferably from 15 to 40%.

In some embodiments the composition is a solution or dispersion of the copolymer in a liquid vehicle.

The invention also relates to a process for preparing a copolymer as described above, comprising:
- supplying a starting copolymer comprising units obtained from vinylidene fluoride and/or trifluoroethylene monomers and also from said fluoro monomers X;
- contacting the starting copolymer with a compound comprising an azide group.

In some embodiments the compound comprising an azide group is sodium azide.

In some embodiments the contacting is carried out in a solvent preferably selected from the following: dimethylformamide; dimethylacetamide; dimethyl sulfoxide; ketones, especially acetone, methyl ethyl ketone, methyl isobutyl ketone and cyclopentanone; furans, especially tetrahydrofuran; esters, especially methyl acetate, ethyl acetate, propyl acetate, butyl acetate and propylene glycol methyl ether acetate; carbonates, especially dimethyl carbonate; and phosphates, especially triethyl phosphate.

The invention also relates to a composition comprising:
- a first copolymer comprising units obtained from vinylidene fluoride and/or trifluoroethylene monomers and also from fluoro monomers X' comprising a double bond and a leaving group selected from chlorine, bromine and iodine atoms;
- a second copolymer comprising units obtained from vinylidene fluoride and/or trifluoroethylene monomers and also from fluoro monomers X comprising a double bond and a leaving group selected from chlorine, bromine and iodine atoms, some or all of the leaving groups being replaced with azide groups in the copolymer.

In certain embodiments the fluoro monomers X are selected from chlorotrifluoroethylene and chlorofluoroethylene; and/or the fluoro monomers X' are selected from chlorotrifluoroethylene and chlorofluoroethylene; and preferably the fluoro monomers X and X' are identical.

In some embodiments the first polymer comprises both units obtained from vinylidene fluoride monomers and units obtained from trifluoroethylene monomers, the proportion of units obtained from trifluoroethylene monomers being preferably from 15 to 55 mol % relative to the sum of the units obtained from vinylidene fluoride and trifluoroethylene monomers; and/or the second copolymer comprises both units obtained from vinylidene fluoride monomers and units obtained from trifluoroethylene monomers, the proportion of units obtained from trifluoroethylene monomers being preferably from 15 to 55 mol % relative to the sum of the units obtained from vinylidene fluoride and trifluoroethylene monomers.

In some embodiments the first copolymer comprises a total amount of units obtained from fluoro monomers X of 1 to 20 mol %, preferably of 2 to 15 mol %; and/or the second copolymer comprises a total amount of units obtained from fluoro monomers X' of 1 to 20 mol %, preferably of 2 to 15 mol %.

In certain embodiments the composition comprises from 5 to 95% by weight of first copolymer and from 5 to 95% by weight of second copolymer; preferably from 30 to 70% by weight of first copolymer and from 30 to 70% by weight of second copolymer; the amounts being expressed relative to the sum of the first copolymer and the second copolymer.

In certain embodiments the composition is a solution or dispersion of the first copolymer and the second copolymer in a liquid vehicle.

The invention also relates to a process for producing a composition as described above, comprising:
- supplying the first copolymer;
- supplying the second copolymer;
- mixing the first copolymer and the second copolymer, preferably in a liquid vehicle.

In some embodiments, supplying the second copolymer comprises preparing this second copolymer, comprising:
- supplying a starting copolymer comprising units obtained from vinylidene fluoride and/or trifluoroethylene monomers and also from said fluoro monomers X;
- contacting the starting copolymer with a compound comprising an azide group.

In some embodiments the compound comprising an azide group is sodium azide.

In some embodiments the contacting is carried out in a solvent preferably selected from the following: dimethylformamide; dimethylacetamide; dimethyl sulfoxide; ketones, especially acetone, methyl ethyl ketone, methyl isobutyl ketone and cyclopentanone; furans, especially tetrahydrofuran; esters, especially methyl acetate, ethyl acetate, propyl acetate, butyl acetate and propylene glycol methyl ether acetate; carbonates, especially dimethyl carbonate; and phosphates, especially triethyl phosphate.

The invention also relates to a process for producing a film, comprising:
- apply a copolymer as described above or a composition as described above to a substrate;
- crosslinking the copolymer or the composition.

In some embodiments the crosslinking is carried out according to a predefined pattern, the process subsequently comprising the removal of portions of copolymer or composition not crosslinked, by contacting them with a solvent.

The invention also relates to a film obtained by the process described above.

The invention also relates to an electronic device comprising a film as described above, the electronic device being preferably selected from field-effect transistors, memory devices, condensers, sensors, actuators, electromechanical microsystems, electrocaloric devices, and haptic devices.

The present invention makes it possible to overcome the disadvantages of the prior art. The present invention more particularly provides crosslinkable electroactive polymers, and compositions comprising crosslinkable electroactive polymers. After crosslinking, the invention provides access to insoluble polymer films which have predefined patterns and exhibit one or more (and preferably all) of the following properties: a semicrystalline morphology, a high dielectric constant, a high saturation polarization, and a Curie transition.

Moreover, the invention allows the crosslinking to be implemented without employing excessive irradiation energy and without adding crosslinking agent.

The invention is based on the use of copolymers comprising building blocks (here also called structural units, or simply units) obtained from VDF and/or TrFE monomers and also from monomers comprising a leaving group (Br, Cl or I). Some of the leaving groups are replaced with azide groups, which allow crosslinking. This replacement may be carried out simply by reacting the polymer with an azide compound such as sodium azide. Others of the leaving groups are retained, endowing the polymer film with the advantageous properties referred to above.

Another advantage of the invention is that it provides access to crosslinkable polymers from ranges of existing polymers whose synthesis have been fully mastered, and hence does not require the development of new polymerization processes.

Two principal embodiments may be considered for implementing the invention:
- one possibility is to use a single fluoropolymer, to treat it with an azide compound so as to partially replace the leaving groups with azide groups, and then to crosslink this fluoropolymer.
- the other possibility is to use a mixture of fluoropolymers, only one of which has had leaving groups replaced with azide groups, and then to crosslink this mixture of fluoropolymers.

DESCRIPTION OF EMBODIMENTS OF THE INVENTION

Figure 1:
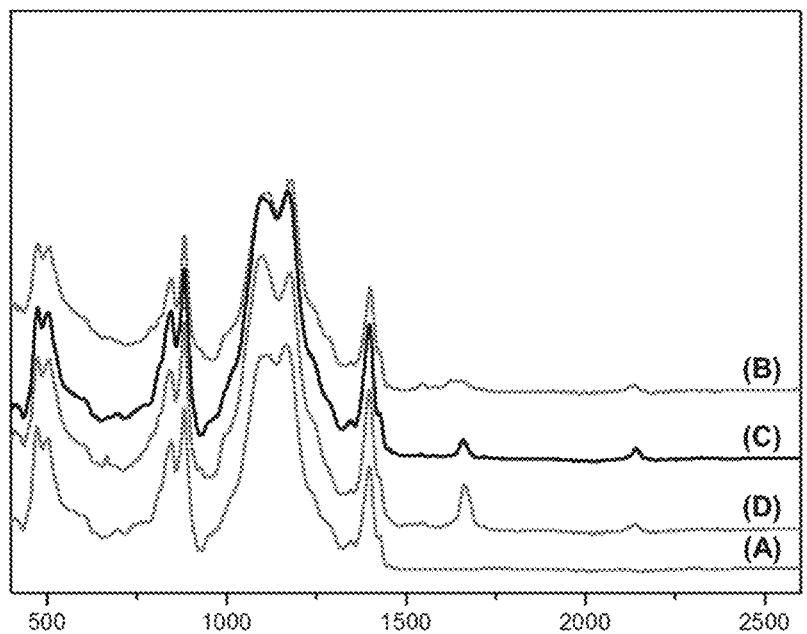
FIG. 1 is a graph showing the infrared absorption spectra of polymers according to the invention and of a control polymer (in accordance with example 1). The wavelength is reported on the abscissa axis.

The invention is now described in greater detail and in a non-limiting manner in the description that follows.

The invention is based on the use of fluoropolymers, hereinafter designated polymers PF. These polymers PF can be used as starting polymers modified for grafting with azide groups ($-N_3$); the fluoropolymers thus modified are hereinafter designated polymers PFM.

Polymer PF

According to the invention, a polymer PF comprises units obtained from VDF and/or TrFE monomers and from at least one other fluoro monomer X comprising a double bond and a leaving group selected from Cl, Br and I.

In some variants, the polymer PF is a P(VDF-X) copolymer.

In some variants, the polymer PF is a P(TrFE-X) copolymer.

In some preferred embodiments the polymer PF is a P(VDF-TrFE-X) terpolymer.

In other variants, units obtained from a plurality of different fluoro monomers X may be present in the polymer PF.

In other variants, units obtained from one or more additional monomers, further to those referred to above, may be present in the polymer PF.

The polymer PF preferably comprises units obtained both from VDF and from TrFE.

The proportion of units obtained from TrFE is preferably from 5 to 95 mol %, relative to the sum of the units obtained from VDF and TrFE, and especially from 5 to 10 mol %; or from 10 to 15 mol %; or from 15 to 20 mol %; or from 20 to 25 mol %; or from 25 to 30 mol %; or from 30 to 35 mol %; or from 35 to 40 mol %; or from 40 to 45 mol %; or from 45 to 50 mol %; or from 50 to 55 mol %; or from 55 to 60 mol %; or from 60 to 65 mol %; or from 65 to 70 mol %; or from 70 to 75 mol %; or from 75 to 80 mol %; or from 80 to 85 mol %; or from 85 to 90 mol %; or from 90 to 95 mol %. A range from 15 to 55 mol % is particularly preferred.

The fluoro monomer X comprises at least one fluorine atom.

The fluoro monomer X preferably comprises not more than 5 carbon atoms, more preferably not more than 4 carbon atoms, more preferably still not more than 3 carbon atoms, and more preferably still it comprises 2 carbon atoms.

The formula of the fluoro monomer X is preferably $CX_1X_2=CX_3X_4$, in which each group $X_1$, $X_2$, $X_3$ and $X_4$ independently represents an H, F, Cl, I or Br atom or a C1-C3 (preferably C1-C2) alkyl group optionally containing one or more substituents selected from F, Cl, I and Br.

In some embodiments, each group $X_1$, $X_2$, $X_3$ and $X_4$ independently represents an H, F, Cl, I or Br atom or a methyl group optionally containing one or more substituents selected from F, Cl, I and Br.

In some embodiments, each group $X_1$, $X_2$, $X_3$ and $X_4$ independently represents an H, F, Cl, I or Br atom.

In some embodiments, only one of the groups $X_1$, $X_2$, $X_3$ and $X_4$ represents a Cl or I or Br atom, and the others of the groups $X_1$, $X_2$, $X_3$ and $X_4$ independently represent: an H or F atom or a C1-C3 alkyl group optionally containing one or more fluorine substituents; preferably, an H or F atom or a C1-C2 alkyl group optionally containing one or more fluorine substituents; and more preferably an H or F atom or a methyl group optionally containing one or more fluorine substituents.

With particular preference the fluoro monomer X is selected from bromotrifluoroethylene, chlorofluoroethylene, chlorotrifluoroethylene and chlorotrifluoropropene. Chlorofluoroethylene may denote either 1-chloro-1-fluoroethylene or 1-chloro-2-fluoroethylene. The 1-chloro-1-fluoroethylene isomer is preferred. Chlorotrifluoropropene is preferably 1-chloro-3,3,3-trifluoropropene or 2-chloro-3,3,3-trifluoropropene.

The most preferred fluoro monomers X are chlorotrifluoroethylene (CTFE) and chlorofluoroethylene, especially 1-chloro-1-fluoroethylene (CFE).

The proportion of units obtained from fluoro monomers X in the polymer PF (relative to the entirety of the units) may vary, for example, from 0.5 to 1 mol %; or from 1 to 2 mol %; or from 2 to 3 mol %; or from 3 to 4 mol %; or from 4 to 5 mol %; or from 5 to 6 mol %; or from 6 to 7 mol %; or from 7 to 8 mol %; or from 8 to 9 mol %; or from 9 to 10 mol %; or from 10 to 12 mol %; or from 12 to 15 mol %; or from 15 to 20 mol %; or from 20 to 25 mol %; or from 25 to 30 mol %; or from 30 to 40 mol %; or from 40 to 50 mol %. Ranges from 1 to 20 mol %, and preferably from 2 to 15 mol %, are particularly appropriate.

The molar composition of the units in the polymers PF may be determined by various means such as infrared spectroscopy or Raman spectroscopy. Conventional methods of elemental analysis of carbon, fluorine and chlorine or bromine or iodine elements, such as X-ray fluorescence spectroscopy, make it possible to calculate unambiguously the mass composition of the polymers, from which the molar composition is deduced.

Use may also be made of multinuclear NMR techniques, in particular proton (1H) and fluorine (19F) NMR techniques, by analysis of a solution of the polymer in an appropriate deuterated solvent. The NMR spectrum is recorded on an FT-NMR spectrometer equipped with a multinuclear probe. The specific signals given by the various monomers in the spectra produced according to one or other nucleus are then identified. Thus, for example, the unit derived from TrFE gives, in proton NMR, a specific signal characteristic of the CFH group (at around 5 ppm). The same is true of the CH$_2$ groups of the VDF (broad unresolved peak centered at 3 ppm). The relative integration of the two signals gives the relative abundance of the two monomers, i.e. the VDF/TrFE molar ratio.

In the same way, the —CFH-group of TrFE for example gives characteristic and well-isolated signals in fluorine NMR. The combination of the relative integrations of the various signals obtained in proton NMR and in fluorine NMR results in a system of equations whose solution provides the molar concentrations of the units derived from the various monomers.

Finally, it is possible to combine elemental analysis, for example for the heteroatoms, such as chlorine or bromine or iodine, and NMR analysis. Thus, the content of units derived from CTFE for example can be determined by a measurement of the chlorine content by elemental analysis.

A person skilled in the art thus has available a range of methods or a combination of methods allowing him/her to determine, without ambiguity and with the necessary accuracy, the composition of the polymers PF.

The polymer PF is preferably random and linear.

It is advantageously thermoplastic and not, or not very, elastomeric (as opposed to a fluoroelastomer).

The polymer PF may be homogeneous or heterogeneous. A homogeneous polymer has a uniform chain structure, the statistical distribution of the units derived from the various monomers varying very little between the chains. In a heterogeneous polymer, the chains have a distribution of units obtained from the various monomers of multimodal or spread-out type. A heterogeneous polymer therefore comprises chains richer in a given unit and chains poorer in this unit. An example of a heterogeneous polymer appears in the document WO 2007/080338.

The polymer PF is an electroactive polymer.

More particularly, preferably, it exhibits a dielectric permittivity maximum of 0 to 150° C., preferably of 10 to 140° C. In the case of ferroelectric polymers, this maximum is called the "Curie temperature" and corresponds to the transition from a ferroelectric phase to a paraelectric phase. This temperature maximum, or transition temperature, may be measured by differential scanning calorimetry or by dielectric spectroscopy.

The polymer preferably has a melting temperature of 90 to 180° C., more particularly of 100 to 170° C. The melting temperature can be measured by differential scanning calorimetry according to the ASTM D3418 standard.

Production of a Polymer PF

Although the PF polymer may be produced using any known process, such as emulsion polymerization, suspension polymerization and solution polymerization, it is preferable to use the process described in WO 2010/116105. This process makes it possible to obtain polymers of high molecular weight and of appropriate structuring.

In short, the preferred process comprises the following steps:
  charging an initial mixture containing only VDF and/or TrFE (without the fluoro monomer X) to a stirred autoclave containing water;
  heating the autoclave to a predetermined temperature, close to the polymerization temperature;
  injecting a radical polymerization initiator mixed with water into the autoclave, in order to achieve a pressure in the autoclave which is preferably at least 80 bar, so as to form a suspension of the VDF and/or TrFE monomers in water;
  injecting a second mixture of VDF and/or TrFE and X (and optionally additional monomers, if any) into the autoclave;
  as soon as the polymerization reaction begins, continuously injecting said second mixture into the autoclave reactor, in order to maintain the pressure at an essentially constant level, preferably of at least 80 bar.

The radical polymerization initiator may in particular be an organic peroxide of peroxydicarbonate type. It is generally used in an amount of 0.1 to 10 g per kilogram of total monomer charge. The amount used is preferably from 0.5 to 5 g/kg.

The initial mixture advantageously comprises only VDF and/or TrFE in a proportion equal to that of the desired final polymer.

The second mixture advantageously has a composition which is adjusted such that the total composition of monomers introduced into the autoclave, including the initial mixture and the second mixture, is equal or approximately equal to the composition of the desired final polymer.

The weight ratio of the second mixture to the initial mixture is preferably from 0.5 to 2, more preferably from 0.8 to 1.6.

The implementation of this process with an initial mixture and a second mixture makes the process independent of the reaction initiation phase, which is often unpredictable. The polymers thus obtained are in the form of a powder, without crust or skin.

The pressure in the autoclave reactor is preferably from 80 to 110 bar, and the temperature is maintained at a level of preferably from 40° C. to 60° C.

The second mixture can be injected continuously into the autoclave. It can be compressed before being injected into the autoclave, for example using a compressor or two successive compressors, generally to a pressure greater than the pressure in the autoclave.

After synthesis, the polymer can be washed and dried.

The weight-average molar mass Mw of the polymer is preferably at least 100 000 g·mol$^{-1}$, preferably at least 200 000 g·mol$^{-1}$ and more preferably at least 300 000 g·mol$^{-1}$ or at least 400 000 g·mol$^{-1}$. It can be adjusted by modifying certain process parameters, such as the temperature in the reactor, or by adding a transfer agent.

The molecular weight distribution can be estimated by SEC (size exclusion chromatography) with dimethylformamide (DMF) as eluent, with a set of 3 columns of increasing porosity. The stationary phase is a styrene-DVB gel. The detection method is based on a measurement of the refractive index, and the calibration is carried out with polystyrene standards. The sample is dissolved at 0.5 g/l in DMF and filtered through a 0.45 µm nylon filter.

Polymer PFM

The polymer PFM may be produced from a polymer PF by reaction with an azide compound.

The polymer PFM preferably comprises azide groups integrated into the polymer chain in the form of units —C—C(X)N$_3$—C—, in which X represents a hydrogen or halogen atom or a substituted or unsubstituted alkyl group, and preferably X represents H or F.

Possible azide compounds for the reaction include the compounds of formula M(N$_3$)$_n$, in which M represents a monovalent or polyvalent cation or H or a halogen (I, Br or Cl) or a pseudo halogen (especially CN), and n represents an integer. Preferably N is a cation and n corresponds to the valence of the cation.

M may especially be a metal cation or an ammonium cation (or a derivative, such as a tetraalkylammonium cation). Monovalent (potassium or sodium, for example) or divalent (calcium or magnesium, for example) metal cations are preferred.

The azide compound is preferably selected from sodium azide NaN$_3$ and potassium azide KN$_3$. Sodium azide is particularly preferred.

The polymer PF may be converted to polymer PFM by combining the polymer PF and the azide compound in a solvent in which the polymer PF is dissolved.

The solvent used may especially be dimethylformamide; dimethylacetamide; dimethyl sulfoxide; ketones, especially acetone, methyl ethyl ketone (or butan-2-one), methyl isobutyl ketone and cyclopentanone; furans, especially tetrahydrofuran; esters, especially methyl acetate, ethyl acetate, propyl acetate, butyl acetate and propylene glycol methyl ether acetate; carbonates, especially dimethyl carbonate; and phosphates, especially triethyl phosphate. Mixtures of these compounds may also be used.

The concentration of polymer PF introduced into the reaction mixture may be, for example, from 1 to 200 g/l, preferably from 5 to 100 g/l, and more preferably from 10 to 50 g/l.

The amount of azide compound introduced into the reaction mixture may be adjusted according to the desired degree of replacement of the leaving groups with the azide groups. This amount may therefore be from 0.1 to 0.2 molar equivalent (of azide groups introduced into the reaction mixture, relative to the leaving groups present in the polymer PF); or from 0.2 to 0.3 molar equivalent; or from 0.3 to 0.4 molar equivalent; or from 0.4 to 0.5 molar equivalent; or from 0.5 to 0.6 molar equivalent; or from 0.6 to 0.7 molar equivalent; or from 0.7 to 0.8 molar equivalent; or from 0.8 to 0.9 molar equivalent; or from 0.9 to 1.0 molar equivalent; or from 1.0 to 1.5 molar equivalents; or from 1.5 to 2 molar equivalents; or from 2 to 5 molar equivalents; or from 5 to 10 molar equivalents; or from 10 to 50 molar equivalents.

The reaction is preferably carried out with stirring.

The reaction is preferably carried out at a temperature of 20 to 80° C., more preferably at 30 to 70° C., and more particularly of 40 to 65° C.

The reaction time may be, for example, from 15 minute to 48 hours, preferably from 1 hour to 36 hours, more preferably from 2 to 24 hours.

When the desired reaction time has been reached, the polymer PFM may be precipitated from a nonsolvent, such as deionized water, for example. It may subsequently be filtered and dried.

The composition of the polymer PFM may be characterized by elemental analysis and by NMR, as described above, and also by infrared spectrometry. In particular, a valence vibration band characteristic of the azide function is observed at about 2150 cm$^{-1}$. The azide group composition of the polymer PFM may be characterized by differential scanning calorimetry, preferably with modulation, by correlating the exothermic reaction enthalpy of the azide groups with the results of elemental analysis and/or of the NMR, during the first temperature increase.

In some embodiments, the entirety of the leaving groups in the starting polymer PF have been replaced by azide groups —N$_3$ in the polymer PFM.

In other (preferred) embodiments, the leaving groups in the starting polymer PF have been replaced only partially with azide groups in the polymer PFM.

Accordingly, the molar proportion of leaving groups (for example of groups Cl when using CTFE or CFE) replaced with azide groups may be from 5 to 10 mol %; or from 10 to 20 mol %; or from 20 to 30 mol %; or from 30 to 40 mol %; or from 40 to 50 mol %; or from 50 to 60 mol %; or from 60 to 70 mol %; or from 70 to 80 mol %; or from 80 to 90 mol %; or from 90 to 95 mol %; or more than 95 mol %.

Accordingly, in the polymer PFM, the proportion of residual structural units containing a leaving group (Cl or Br or I) may be, for example, from 0.1 to 0.5 mol %; or from 0.5 to 1 mol %; or from 1 to 2 mol %; or from 2 to 3 mol %; or from 3 to 4 mol %; or from 4 to 5 mol %; or from 5 to 6 mol %; or from 6 to 7 mol %; or from 7 to 8 mol %; or from 8 to 9 mol %; or from 9 to 10 mol %; or from 10 to 12 mol %; or from 12 to 15 mol %; or from 15 to 20 mol %; or from 20 to 25 mol %; or from 25 to 30 mol %; or from 30 to 40 mol %; or from 40 to 50 mol %. Ranges from 1 to 15 mol %, and preferably from 2 to 10 mol %, are particularly preferred.

Accordingly as well, in the polymer PFM, the proportion of structural units containing an azide group may be, for example, from 0.1 to 0.5 mol %; or from 0.5 to 1 mol %; or from 1 to 2 mol %; or from 2 to 3 mol %; or from 3 to 4 mol %; or from 4 to 5 mol %; or from 5 to 6 mol %; or from 6 to 7 mol %; or from 7 to 8 mol %; or from 8 to 9 mol %; or from 9 to 10 mol %; or from 10 to 12 mol %; or from 12 to 15 mol %; or from 15 to 20 mol %; or from 20 to 25 mol %; or from 25 to 30 mol %; or from 30 to 40 mol %; or from 40 to 50 mol %. Ranges from 1 to 15 mol %, and preferably from 2 to 10 mol %, are particularly preferred.

Preparation of a Film

A fluoropolymer film according to the invention may be prepared by applying either solely one or more polymers PFM or else at least one polymer PF and at least one polymer PFM to a substrate. In this latter case, the monomers containing leaving groups that are used for producing the polymer PF are preferably the same as those used for producing the polymer PFM.

If only one or more polymers PFM are used, only partial replacement of the leaving groups with the azide groups is desired. If at least one polymer PF is used in combination with at least one polymer PFM, only some or all of the leaving groups of the polymer PFM may have been replaced with azide groups.

Where at least one polymer PF is combined with at least one polymer PFM, the mass proportion of polymer(s) PF relative to the entirety of the polymers PF and PFM may especially be from 5 to 10%; or from 10 to 20%; or from 20 to 30%; or from 30 to 40%; or from 40 to 50%; or from 50 to 60%; or from 60 to 70%; or from 70 to 80%; or from 80 to 90%; or from 90 to 95%.

The production of the film may comprise a step of application of polymers PFM (or PFM and PF) to a substrate, followed by a crosslinking step.

The polymers PFM (or PFM and PF) may also be combined with one or more other polymers, especially fluoropolymers, such as, more particularly, a P(VDF-TrFE) copolymer.

The substrate may especially be a glass, silicon, polymer-material or metal surface.

To carry out application, one preferred method involves dissolving or suspending the polymer or polymers in a liquid vehicle to form an "ink" composition, which is subsequently applied to the substrate. The liquid vehicle is preferably a solvent. This solvent is preferably selected from the following: dimethylformamide; dimethylacetamide; dimethyl sulfoxide; ketones, especially acetone, methyl ethyl ketone, methyl isobutyl ketone and cyclopentanone; furans, especially tetrahydrofuran; esters, especially methyl acetate, ethyl acetate, propyl acetate, butyl acetate and propylene glycol methyl ether acetate; carbonates, especially dimethyl carbonate; and phosphates, especially triethyl phosphate. Mixtures of these compounds may also be used.

The total mass concentration of polymers in the liquid vehicle may especially be from 0.1 to 30%, preferably from 0.5 to 20%.

The ink may optionally comprise one or more additives, especially selected from surface tension modifiers, rheology modifiers, aging resistance modifiers, adhesion modifiers, pigments or dyes, and fillers (including nanofillers). Preferred additives are especially the co-solvents which modify the surface tension of the ink. In particular, in the case of solutions, the compounds may be organic compounds that are miscible with the solvents used. The ink composition may also include one or more additives which were used for the synthesis of the polymer or polymers.

In some embodiments the ink comprises at least one crosslinking assistant, preferably a photoinitiator and/or a crosslinking agent.

The photoinitiator may be selected, for example, from 2-hydroxy-2-methyl-1-phenylpropan-1-one, 2,4,6-trimethylbenzoyldiphenylphosphine oxide, diphenylphosphine oxide, 2,4,6-trimethylbenzoyl phenylphosphinate, 1-hydroxycyclohexyl phenyl ketone, bis(2,6-dimethoxybenzoyl)-2,4,4-trimethylpentylphosphine oxide, 1-[4-(2-hydroxyethoxy)phenyl]-2-hydroxy-2-methyl-1-propanepropan-1-one, 2,2-dimethoxy-1,2-diphenylethan-1-one, 2-methyl-1-[4-(methylthio)phenyl]-2-morpholinopropan-1-one, 2,4-diethylthioxanthonediethylthioxanthone, derivatives thereof, and mixtures thereof.

The crosslinking agent may for example be selected from molecules, oligomers, and polymers which carry at least two reactive double bonds, such as triallyl isocyanaurate (TAIC), di- or poly(meth)acrylic compounds, polybutadiene; compounds which carry at least two reactive carbon-carbon or carbon-nitrogen triple bonds, such as tripropargyl amine; derivatives thereof, and mixtures thereof.

In other (preferred) embodiments, there is no crosslinking assistant, such as a photoinitiator or a crosslinking agent, present in the ink applied to the substrate.

Application may be carried out especially by spin-coating, spray coating, bar coating, dip coating, roll-to-roll printing, screen printing, lithographic printing or inkjet printing.

Following application, the liquid vehicle is evaporated.

The fluoropolymer layer thus constituted may have especially a thickness of 50 nm to 50 µm, preferably of 100 nm to 5 µm, more preferably of 150 nm to 1 µm, and more preferably of 200 nm to 500 nm.

The crosslinking step may be carried out especially by heat treatment and/or by UV irradiation. UV irradiation is advantageous especially when only part of the polymer film has to be crosslinked, according to a predetermined pattern, since in that case a mask can be used to protect the parts of the film which are not intended for crosslinking.

Without wishing to be bound by any theory, it is thought that, during the crosslinking step, the azide groups tend to undergo decomposition to form nitrene functions. These functions are able to react with C—F or C—H groups, leading to the crosslinking of the polymer or polymers.

Heat treatment may be carried out by subjecting the film, for example, to a temperature of 50 to 150° C., preferably of 60 to 130° C., in a ventilated oven or on a hotplate, for example. The heat treatment time may especially be from 1 minute to 1 hour, preferably from 2 to 15 minutes.

UV irradiation denotes irradiation by electromagnetic radiation at a wavelength of 200 to 650 nm, and preferably of 220 to 500 nm. Wavelengths of 250 to 450 nm are particularly preferred. The radiation may be monochromatic or polychromatic.

The total UV irradiation dose is preferably less than or equal to 40 $J/cm^2$, more preferably less than or equal to 20 $J/cm^2$, more preferably less than or equal to 10 $J/cm^2$, more preferably less than or equal to 5 $J/cm^2$, more preferably less than or equal to 3 $J/cm^2$. A low dose is advantageous for avoiding degradation of the surface of the film.

The treatment is carried out, preferably, essentially in the absence of oxygen, again with the aim of preventing any degradation of the film. For example, the treatment may be carried out under vacuum, or in an inert atmosphere, or with the film protected from the ambient air with a physical barrier which is impervious to oxygen (a glass plate or polymer film, for example).

According to one variant of the invention, a heat pretreatment and/or a heat aftertreatment may be carried out, before and/or after the UV irradiation.

The heat pretreatment and the heat aftertreatment may especially be carried out at a temperature of 40 to 80° C., preferably at 50 to 70° C., and, for example, at approximately 60° C., for a time of less than 30 minutes, preferably less than 15 minutes.

These treatments improve the effectiveness of the crosslinking reaction (reducing the loss of thickness of the film, lowering the required UV dose, enhancing the roughness of the film).

When crosslinking has not been carried out over the entirety of the film, a development step may be carried out subsequently, so as to remove the portions of the film not crosslinked and to reveal the desired geometric pattern for the film. Development may be carried out by contacting the film with a solvent, preferably by immersion in a solvent bath. This solvent may preferably be selected from the following: dimethylformamide; dimethylacetamide; dimethyl sulfoxide; ketones, especially acetone, methyl ethyl ketone, methyl isobutyl ketone and cyclopentanone; furans, especially tetrahydrofuran; esters, especially methyl acetate, ethyl acetate, propyl acetate, butyl acetate and propylene glycol methyl ether acetate; carbonates, especially dimethyl carbonate; and phosphates, especially triethyl phosphate. Mixtures of these compounds may also be used.

Added to this solvent may be a certain amount of nonsolvent liquid, preferably from 50% to 80% by mass relative to the total of the solvent and the nonsolvent. The nonsolvent liquid may more particularly be any solvent other than the following solvents: dimethylformamide; dimethylacetamide; dimethylsulfoxide; ketones; furans; esters; carbonates; phosphates. It may more particularly be a protic solvent, this being a solvent comprising at least one H atom bonded to an O atom or to an N atom. It is possible with preference to use an alcohol (such as ethanol or isopropanol)

or demineralized water. Mixtures of nonsolvents may also be used. The presence of a nonsolvent in combination with the solvent may enable a further improvement in the definition of the patterns obtained, relative to the hypothetical case of the nonsolvent being used only at the rinsing stage.

Development may be carried out preferably at a temperature of 10 to 100° C., preferably at 15 to 80° C., and more preferably at 20 to 60° C. The development time is preferably less than 15 minutes, more preferably less than 10 minutes.

After development, the film may be rinsed with a liquid which is a nonsolvent for the fluoropolymer. It may more particularly be a protic solvent, this being a solvent comprising at least one H atom bonded to an O atom or to an N atom. It is possible with preference to use an alcohol (such as ethanol or 'isopropanol) or demineralized water. Mixtures of nonsolvents may also be used. This rinsing step enhances the definition of the film patterns.

Rinsing may be carried out especially by spraying the nonsolvent onto the crosslinked PFM film. Rinsing may also be carried out by immersion in a bath of nonsolvent. The temperature during rinsing may preferably be from 5 to 80° C., more preferably from 10 to 70° C., and particularly at ambient temperature of 15 to 35° C. The time of the rinsing step is preferably less than 10 minutes, more preferably less than 5 minutes, and particularly less than 1 minute.

After the optional rinsing, the film may be dried in air, and may optionally undergo a post crosslinking heat treatment, by exposure to a temperature ranging, for example, from 30 to 150° C., preferably from 50 to 140° C.

The film according to the invention is preferably characterized by a dielectric constant (or relative permittivity) at 1 kHz and at 25° C. of not less than 10, more preferably not less than 15, more preferably not less than 20, more preferably not less than 25.

The dielectric constant may be measured using an impedance meter capable of measuring the capacitance of the material with knowledge of the geometric dimensions (thickness and opposing surfaces). Said material is placed between two conductive electrodes Production of an Electronic Device.

The film according to the invention may be used as a layer in an electronic device.

Thus one or more additional layers may be applied to the substrate equipped with the film of the invention, examples being one or more layers of polymers, of semiconducting materials or of metals, in a manner known per se.

The term "electronic device" is intended to mean either a single electronic component, or a set of electronic components, which is (are) capable of performing one or more functions in an electronic circuit.

According to certain variations, the electronic device is more particularly an optoelectronic device, that is to say a device capable of emitting, detecting or controlling an electromagnetic radiation.

Examples of electronic devices, or where appropriate optoelectronic devices, to which the present invention relates are transistors (especially field-effect transistors), chips, batteries, photovoltaic cells, light-emitting diodes (LEDs), organic light-emitting diodes (OLEDs), sensors, actuators, transformers, haptic devices, electromechanical microsystems, electrocaloric devices, and detectors.

According to one preferred variant, the film according to the invention may be used in a field-effect transistor, especially an organic field-effect transistor, as a layer or part of the dielectric layer.

The electronic and optoelectronic devices are used in and integrated into numerous electronic sub-assemblies, items of equipment or apparatuses and in numerous objects and applications, such as televisions, mobile telephones, rigid or flexible screens, thin-film photovoltaic modules, lighting sources, energy converters and sensors, etc.

EXAMPLES

The following examples illustrate the invention without limiting it.

Example 1—Production of a Modified Polymer According to the Invention

The starting material used is a P(VDF-TrFE-CTFE) terpolymer. This terpolymer contains 61.8 mol % of units obtained from VDF, 30.4 mol % of units obtained from TrFE and 7.8 mol % of units obtained from CTFE.

1.2 g of terpolymer powder are dissolved in 50 ml of dimethylformamide. 39 mg (0.5 mol equivalent, relative to the number of mols of CTFE) of $NaN_3$ are subsequently added to the reaction mixture. The reaction is kept at 55° C. for 12 h. The product is recovered after precipitation from deionized water. It is subsequently filtered and dried at 40° C. under vacuum for 24 h.

The experiment is then repeated with 0.1 mol equivalent or 10 mol equivalents of $NaN_3$, relative to the number of mols of CTFE.

The infrared spectrum of the various polymers is obtained with a Fourier transform infrared (FTIR) spectrometer in ATR (reflection) mode, directly on the polymer film:

The results are represented in FIG. 1, with the following designations:

A: unmodified starting terpolymer;
B: terpolymer modified with 0.1 equivalent of $NaN_3$;
C: terpolymer modified with 0.5 equivalent of $NaN_3$;
D: terpolymer modified with 10 equivalents of $NaN_3$.

The valence vibration band characteristic of the azide function is observed at 2150 $cm^{-1}$; the band characteristic of the intra-chain C=C double bonds is observed at 1710 $cm^{-1}$.

Example 2—Production of a Film According to the Invention with UV Irradiation

A formulation at 7% by mass in butan-2-one is obtained by mixing an unmodified P(VDF-TrFE-CTFE) terpolymer containing 7.8 mol % of units obtained from CTFE at 50/50 by mass with another P(VDF-TrFE-CTFE) terpolymer containing initially 12.7 mol % of units obtained from CTFE, and modified in the same way as in example 1 with 0.5 equivalent of $NaN_3$.

A 250 nm film is produced on a silicon substrate, on a spin coater, from the formulation prepared above. The resulting film is subsequently dried at 60° C. for 5 min.

The film is crosslinked according to a predefined pattern by UV irradiation (with primarily wavelengths of 300 to 400 nm), the dose administered being 20 $J/cm^2$. The film is subsequently developed by rinsing in cyclopentanone at ambient temperature for 1 minute.

Figure 2:
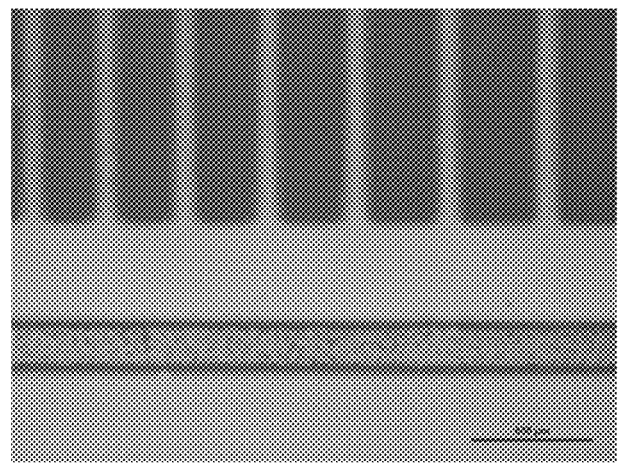
FIG. 2 is a photograph obtained by optical microscopy of a polymer film according to the invention (in accordance with example 2). The scale bar corresponds to 500 μm.

The resulting pattern can be seen on the photograph in FIG. 2. The dark zones are those in which the polymer is present. The pattern exhibits a high resolution.

Another film is then produced in the same way, except that the mixture of unmodified polymer and modified polymer is 80/20 by mass. Dielectric spectroscopy measurements are carried out on:

A: the uncrosslinked film;
B: the film after crosslinking; and
C: the film after crosslinking and development.

Figure 3:
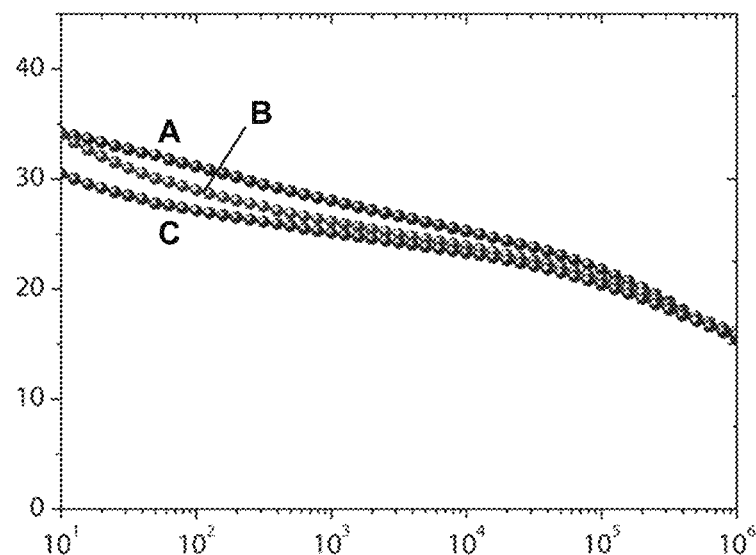
FIG. 3 represents the dielectric constant of a film according to the invention before crosslinking, after crosslinking and after development (in accordance with example 2). The frequency is reported on the abscissa axis and the dielectric constant on the ordinate axis.
Figure 4:
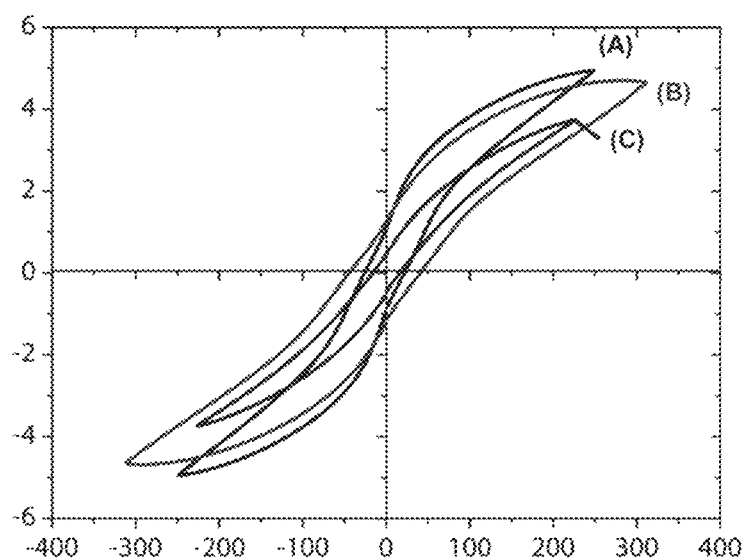
FIG. 4 is a graph representing the polarization curves of a film according to the invention before crosslinking, after crosslinking and after development (in accordance with example 2). The electric field is reported on the abscissa axis and the polarization on the ordinate axis.

The results can be seen in the graphs in FIGS. 3 and 4. The graph in FIG. 3 illustrates the stability of the dielectric properties of the film in the course of the process. The graph in FIG. 4 describes the evolution of the polarization curves during the various stages of producing the film. A high saturation polarization is observed for the crosslinked and developed film C.

Example 3—Production of a Film According to the Invention by Heat Treatment

The modified polymer of example 1 (obtained with 0.5 mol equivalent of $NaN_3$) is used, and a film is produced from this polymer.

The film has a thickness of 2 μm. It is produced on a spin coater and dried at 60° C. for 5 min.

The infrared spectrum of the film is measured before and after crosslinking. Crosslinking is carried out thermally at 125° C. for 20 minutes.

Figure 5:
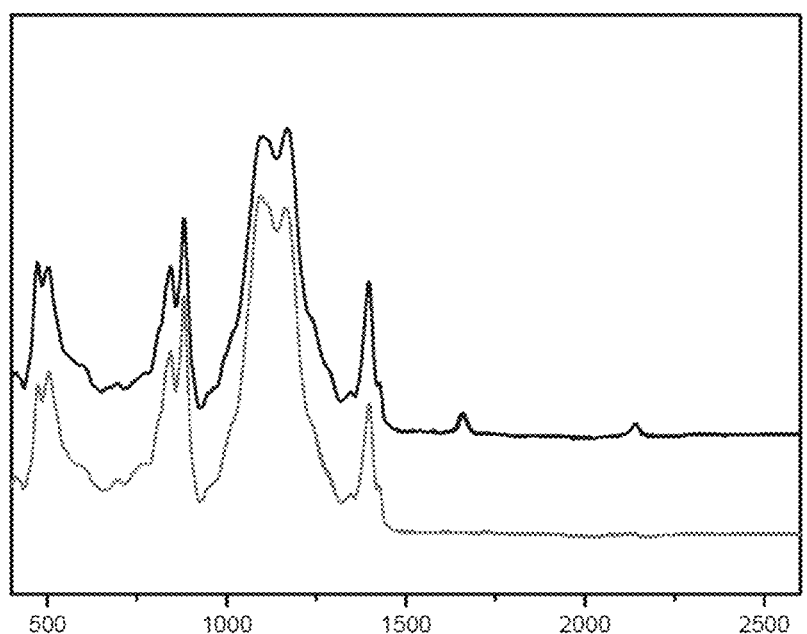
FIG. 5 is a graph showing the infrared absorption spectra of a polymer according to the invention before and after crosslinking (in accordance with example 3). The wavelength is reported on the abscissa axis.

The results can be seen in the graph of FIG. 5. The upper spectrum is that of the film before crosslinking, the lower spectrum that of the film after crosslinking. Bands observed to disappear are the band at 2150 $cm^{-1}$, which is characteristic of the azide function, and that at 1710 $cm^{-1}$, which is characteristic of intra-chain C=C double bonds.

The invention claimed is:

1. A copolymer comprising both units obtained from vinylidene fluoride and units trifluoroethylene monomers and also from fluoro monomers X comprising a double bond and a leaving group selected from chlorine, bromine and iodine atoms, the leaving groups being partially replaced by azide groups in the copolymer.

2. The copolymer as claimed in claim 1, wherein the fluoro monomers X are selected from chlorotrifluoroethylene and chlorofluoroethylene.

3. The copolymer as claimed in claim 1, comprising a total amount of units obtained from fluoro monomers X of 1 to 20 mol %.

4. The copolymer as claimed in claim 1, wherein the molar proportion of leaving groups in the copolymer that are replaced with azide groups is from 5 to 90%.

5. A composition comprising the copolymer as claimed in claim 1, wherein the composition is a solution or dispersion of the copolymer in a liquid vehicle.

6. A process for preparing a copolymer as claimed in claim 1, comprising:
supplying a starting copolymer comprising units obtained from vinylidene fluoride and trifluoroethylene monomers and also from said fluoro monomers X;
contacting the starting copolymer with a compound comprising an azide group.

7. The process as claimed in claim 6, wherein the compound comprising an azide group is sodium azide.

8. The process as claimed in claim 6, wherein the contacting is carried out in a solvent selected from the following: dimethylformamide; dimethylacetamide; dimethyl sulfoxide; ketones; furans, especially tetrahydrofuran; esters; carbonates; and phosphates.

9. A process for producing a film, comprising:
applying a copolymer as claimed in claim 1 to a substrate;
crosslinking the copolymer or the composition.

10. The process as claimed in claim 9, wherein the crosslinking is carried out according to a predefined pattern, the process subsequently comprising the removal of portions of copolymer or composition not crosslinked, by contacting them with a solvent.

11. A film obtained by a process as claimed in claim 9.

12. An electronic device comprising a film as claimed in claim 11.

* * * * *